July 12, 1949.　　　R. E. LAMBERTON　　　2,476,048
COMPRESSOR CONTROL SYSTEM

Filed Nov. 5, 1947　　　　　　　　　　　　5 Sheets-Sheet 1

INVENTOR.
Ralph E. Lamberton
BY
ATTORNEYS

INVENTOR.
Ralph E. Lamberton.
BY
ATTORNEYS

July 12, 1949.　　　　R. E. LAMBERTON　　　　2,476,048
COMPRESSOR CONTROL SYSTEM
Filed Nov. 5, 1947　　　　　　　　　　　　5 Sheets-Sheet 4

INVENTOR.
*Ralph E. Lamberton.*
BY
*Corbett, Mahoney & Miller*
ATTORNEYS

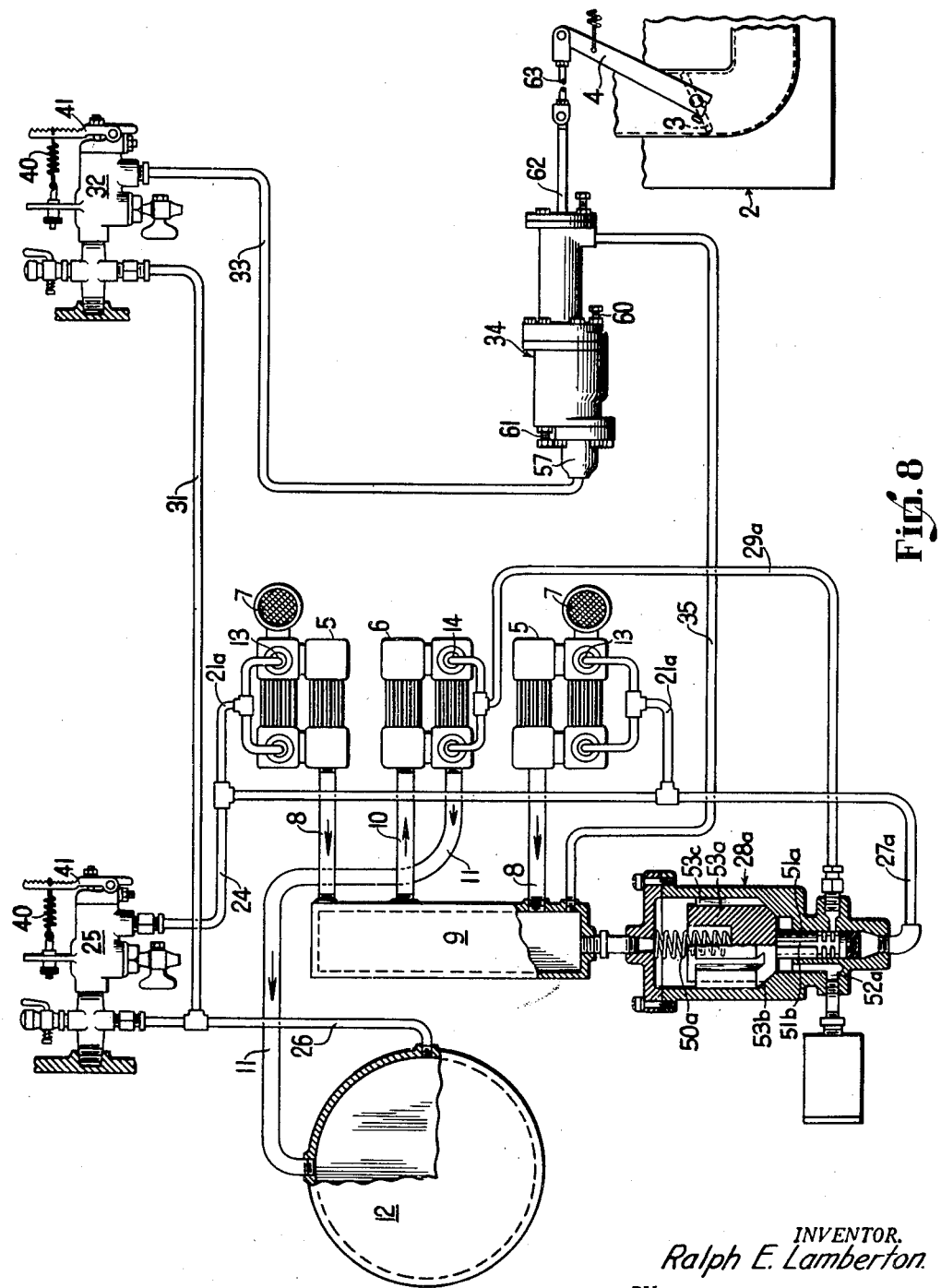

Patented July 12, 1949

2,476,048

UNITED STATES PATENT OFFICE 2,476,048

COMPRESSOR CONTROL SYSTEM

Ralph E. Lamberton, Columbus, Ohio, assignor to The Jaeger Machine Company, Columbus, Ohio, a corporation of Ohio Application November 5, 1947, Serial No. 784,110

13 Claims. (Cl. 230—2)

My invention relates to a compressor control system. It relates, more specifically, to a compressor control apparatus or compressor regulator adaptable to a compressor which is driven by an internal combustion engine. The apparatus of this invention is designed to control and regulate the speed of operation of the driving engine in accordance with the output demand on the compressor.

The control or regulating system of this invention is described hereinafter and illustrated in the drawings as being applied to an air compressor of the portable type. However, it is to be understood that my apparatus can be applied to other types of compressors.

Compressors of the portable type comprise a compressor unit which is usually driven by an internal combustion engine. The engine may be a gasoline engine or a Diesel engine. If it is a gasoline engine, the speed thereof is regulated by directly controlling the throttle valve of the carburetor or by controlling the speed governor which, in turn, controls the throttle valve. If it is a Diesel engine, the speed is usually regulated by directly controlling the speed governor which, in turn, controls the fuel supply valve. My invention, although it is illustrated in the drawings as controlling a throttle valve, is equally applicable to controlling a speed governor or other speed control element of the engine.

The discharge pressure or output pressure of a compressor depends to a great extent upon the speed of the driving engine. The air compressed by the compressor unit is discharged into a storage tank or receiver from which it may be withdrawn and used to operate any compressed air-operated unit or tool. For most uses, the demand on the compressor for air from time-to-time fluctuates widely. To control the compressor to meet this fluctuating demand, there are two systems of control or regulation now in use.

According to the first and older system, control of the compressor is accomplished by unloading mechanism, which unloads the compressor when the pressure in the receiver reaches a predetermined maximum, and loads the compressor when the pressure in the receiver falls to a predetermined minimum. When the compressor is unloaded, the engine fuel supply is reduced so that the engine is slowed to a minimum or idling rate of speed and when the compressor is loaded, the engine fuel supply is increased just prior to and after loading until the speed of the engine is increased to the maximum speed.

In recent years, it has been recognized that it would be desirable to obtain more efficient regulation of compressors by providing a system which would control the engine speed more closely in accordance with the air demand, providing for intermediate speed control as well as for maximum and idling speeds. With a control providing for only maximum and idling speeds, when the demand is light the engine fluctuates repeatedly from one extreme of operation to the other, without possibility of adjusting itself to a more or less constant speed lower than maximum and higher than idling speed to meet the light demand. On the other hand, when the demand is heavy but not equal to nor exceeding the capacity of the compressor, the engine operates at a higher speed than that required to meet the demand and maintain the pressure in the receiver at a suitable working pressure and, consequently, there is a waste of fuel. Thus, with the maximum and minimum type of control, the compressor will unload and load at frequent intervals and the engine will be decelerated and accelerated accordingly, resulting in unsteady or erratic operation which is uneconomical or the compressor will operate at a speed in excess of that required to meet the demand, which is also uneconomical. To overcome these difficulties, a second type of control device has been used in the prior art which provides for not only maximum and minimum speeds of the engine, in accordance with minimum and maximum receiver pressures, but also for an intermediate range of speed, in accordance with an intermediate range of receiver pressures, which latter range is a suitable range for most purposes. Thus, an attempt is made to operate the engine at the lowest possible speed which will still maintain a suitable working pressure in the receiver. Consequently, the engine speed will not be continuously fluctuating between the two extremes of maximum and minimum speeds, seeking the particular speed which is correct for the particular air demand. Thus, economies in operation of the compressor result.

It is this latter type of compressor control to which the present invention relates. It is especially applicable to a compressor of the multi-stage type having low pressure cylinders and high-pressure cylinders with an intercooler connected between such cylinders. The air will be taken into the low pressure cylinders where it will be compressed and will then be discharged into the intercooler. From the intercooler the air will be taken into the high pressure cylinders where it will be compressed further and will then be discharged into the receiver. With multi-stage compressors of this type, it is desirable to unload the compressor in steps, that is, to first unload the low-pressure cylinders and then, after a short delay, to unload the high-pressure cylinders and simultaneously vent the intercooler. This results in an economy, since the partially compressed air in the intercooler will not be wasted by venting to the atmosphere but will be withdrawn into the high-pressure cylinders before they are unloaded and before the intercooler is vented.

One of the objects of my invention is to provide a compressor control system in combination with a compressor having a power unit for driving the compressor unit, the power unit being controlled effectively and economically in accordance with pressure demands on the compressor unit.

Another object of my invention is to provide a compressor control system of the type indicated above by means of which the speed of the driving power unit is closely controlled in accordance with pressure demands on the compressor unit.

Another object of my invention is to provide a compressor control system on a compressor wherein a compressor unit is driven by an internal combustion engine and the fuel supply to said engine is varied in accordance with pressure demands on the compressor unit, to thereby vary the speed of the engine in accordance with the demands on the compressor unit.

Another object of my invention is to provide a compressor control system of the type indicated in the preceding paragraph which provides speed control for the engine not only at maximum pressure when the compressor unit is unloaded and the engine is accordingly idled, and at minimum pressure when the compressor unit is loaded and the engine is brought up to maximum speed, but also through an intermediate range of pressure, suitable for normal working conditions, when the engine is maintained at an intermediate speed suitable for driving the compressor unit at a rate to produce a normal working pressure or intermediate pressure.

Still another object of my invention is to provide a control system which is especially applicable to a multi-stage compressor embodying low and high-pressure cylinders with an intermediate intercooler, and a receiver for receiving compressed air from the high pressure cylinders, both intercooler pressure and receiver pressure and the differential therebetween being used for actuating the control system and, consequently, making it possible to use lighter and more sensitive control units than could be employed if receiver pressure alone were used as the actuating mechanism.

A further object of my invention is to provide a compressor control system for use on a multistage compressor which, in one embodiment, not only controls the speed of driving engine in accordance with pressure demands on the compressor unit but also controls unloading of the low-pressure cylinders and high-pressure cylinders in sequence, so that substantially all compressed air will be removed from the intercooler by the high-pressure cylinders before venting of such intercooler.

An additional object of my invention is to provide a compressor control system of the type indicated wherein loading of the high-pressure cylinders will be delayed after loading of the low-pressure cylinders and as the speed of the driving engine is brought up from idling speed so that the engine will have sufficient speed to prevent stalling by the time the high-pressure cylinders are loaded.

A still further object of my invention is to provide a simple yet very effective control system for attaining the objects mentioned above.

As previously indicated, my control system is preferably applied to a compressor embodying an internal combustion driving engine and a compressor unit of the multi-stage type. The engine may be a gasoline engine or a Diesel engine and its speed is varied in the usual way by varying the amount of fuel supplied thereto. The compressor unit comprises low-pressure cylinders which take in air, partially compress it and then force it into an intercooler. From the intercooler, the air is drawn into the high-pressure cylinders of the compressor unit where it is further compressed and then is discharged into the receiver. From the receiver, air may be withdrawn for actuating various pneumatic units or tools. Associated with the various cylinders are the usual valves which function to cause loading and unloading of the cylinders. A valve is provided in association with the intercooler for venting it at the proper instant.

My control system will function to control the loading and unloading valves of the various cylinders, venting of the intercooler, and the speed of the engine in accordance with air withdrawal from the receiver. The control system employs as actuating media, the intercooler pressure, the receiver pressure, and the differential therebetween.

The control system comprises a pressure-actuated regulator which is associated either with the throttle valve or the speed governor of the compressor-driving internal combustion engine. This regulator will serve to regulate the amount of fuel supplied to the engine and, consequently, will regulate its speed. The regulator comprises a casing having intercommunicating cylindrical chambers formed in the opposite ends thereof. In one of these chambers, I provide the main control piston which is mechanically connected to a lever which controls the fuel-supply valve of the engine and, consequently, the speed of the engine. This piston and the lever are normally held in low-speed position by a spring associated therewith. In the other chamber, I provide an auxiliary control piston which can be moved into contact with the main control piston and produce movement of it in the speed-reducing direction. The main control piston is moved in the speed-increasing direction by intercooler pressure. To accomplish this, the chamber of the casing in which the main piston is disposed is connected by a conduit directly to the intercooler. No control valve is provided in this conduit, the intercooler always being in communication with the main piston chamber so that intercooler pressure will move the main piston and the connected fuel-supply lever over into high-speed position. The auxiliary piston is moved in the speed-reducing direction, to produce similar movement of the main piston, by receiver pressure. For this purpose, the auxiliary piston chamber is connected by a conduit to the receiver. However, interposed in this conduit is a first pilot valve which opens to allow fluid from the receiver to reach the auxiliary piston chamber only when receiver pressure builds up to a preselected intermediate pressure. At this intermediate pressure, the receiver pressure on the auxiliary piston will overcome the intercooler pressure on the main piston and thereby move the main piston and connected fuel-supply lever to an intermediate speed position. The loading and unloading valves of the various cylinders are controlled by receiver pressure through the medium of a conduit having a second pilot valve interposed therein. This valve is set to open at a predetermined maximum receiver pressure and to supply fluid under pressure to actuate the unloading valves. This pressure also serves to actuate a valve which vents the intercooler. Venting of the intercooler eliminates the intercooler pressure on the main piston and allows the spring to return such piston and the fuel-supply lever to full-speed position.

In one form of my invention, all of the cylinders are unloaded and the intercooler vented substantially simultaneously. However, in another form of my invention, when the second pilot valve opens at maximum pressure, it actuates the unloading valves of the low-pressure cylinders and actuates a relief valve associated with the intercooler which vents the intercooler and simultaneously actuates the unloading valves of the high pressure cylinders but only after a short period has elapsed subsequently to actuation of the low-pressure cylinders unloading valves. This short delay permits the high-pressure cylinders to pump out most of the partially compressed air from the intercooler before the intercooler is vented. In the first-mentioned form of my invention, a delay valve is associated with the second pilot valve for delaying loading of the high-pressure cylinders until the low-pressure cylinders have pumped air into the intercooler and built up a sufficient pressure to act on the main piston of the regulator to bring the speed of the engine up sufficiently to prevent stalling. In the other form of my invention, the relief valve associated with the intercooler is provided with means for delaying loading of the high-pressure cylinders until the engine picks up sufficient speed to prevent stalling.

The preferred embodiment of my invention is illustrated in the accompanying drawings wherein similar characters of reference designate corresponding parts and wherein:

Figure 8 is a schematic view of a somewhat different form of my control system.

Figure 1:
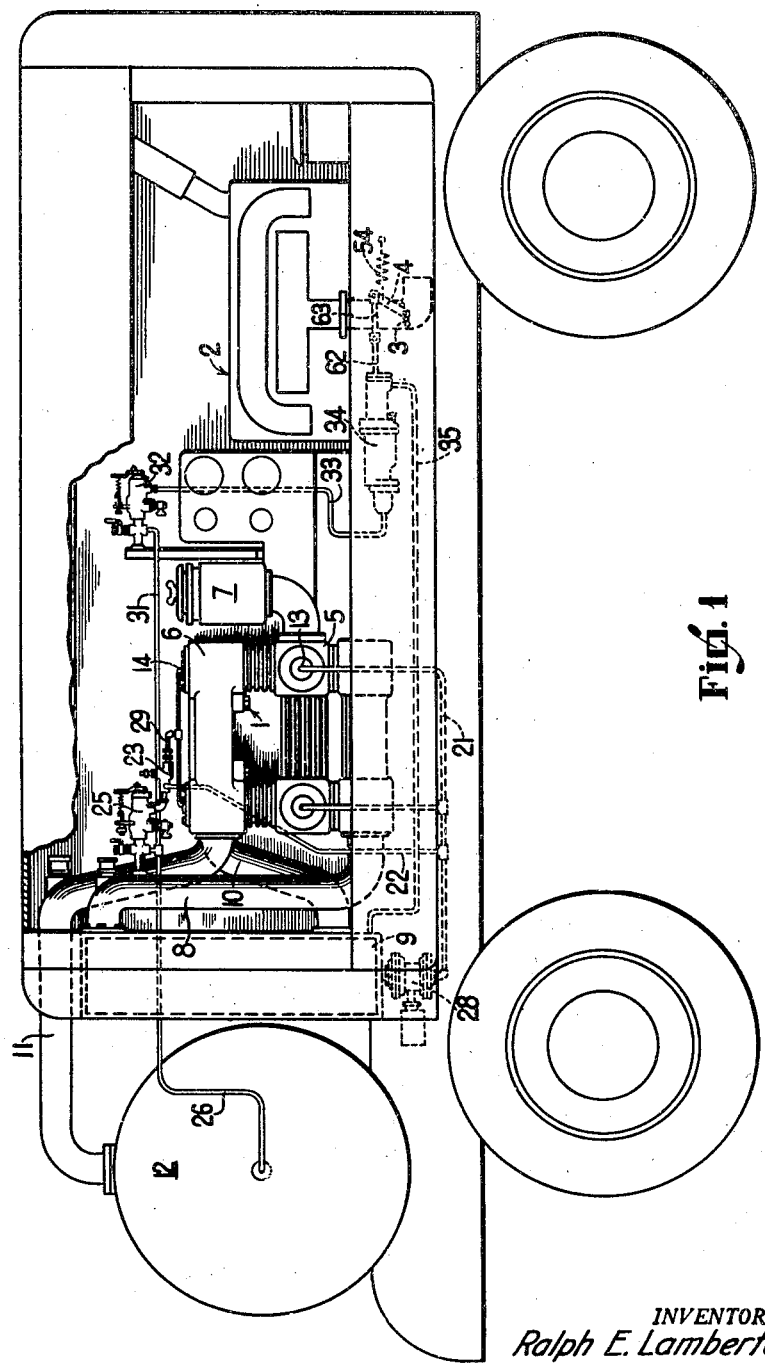
Figure 1 is a general view of a compressor to which my control system is applied.

With reference to the drawings, in Figure 1, I have illustrated generally a compressor of the portable type to which my control system can be applied. In its general structure, this compressor is of the usual type including mainly a compressor unit 1 and a driving engine 2 of an internal combustion type which is coupled by a suitable driving connection to the unit 1. In the compressor illustrated, I have shown my control system controlling the setting of the throttle valve 3 of the carburetor of the engine which is of the gasoline type. However, it is to be understood that it could be applied to the fuel supply valve of a Diesel engine or to a speed governor used on either type of engine and which, in turn, would control the fuel supply valve or any variable speed control element. In the following description I shall refer to the control lever 4, which is shown as controlling the throttle valve 3, simply as the fuel-supply control lever since it can control any type of fuel-supplying valve, as indicated above.

Figure 2:
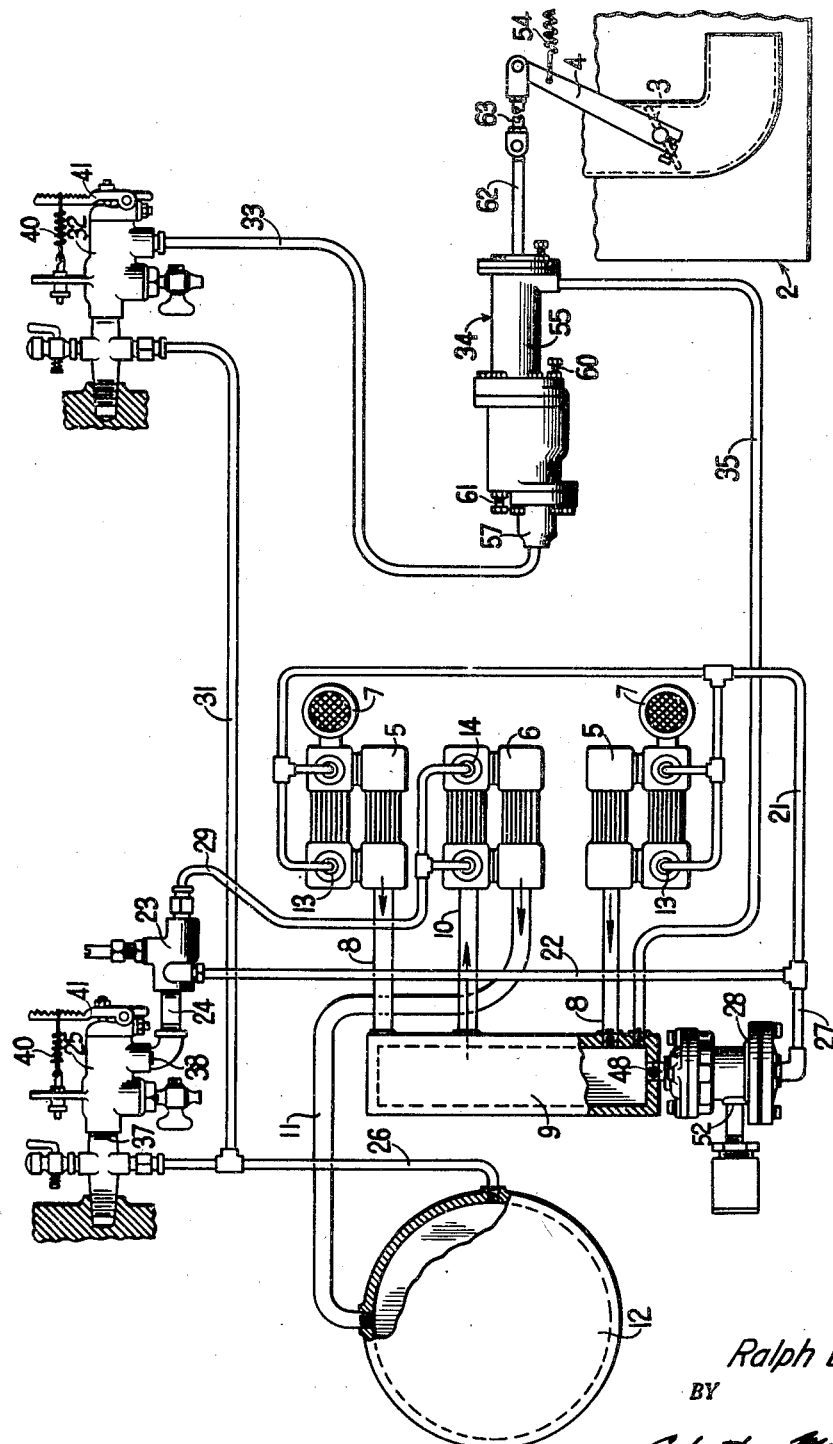
Figure 2 is a schematic view illustrating one form of my control system associated with a suitable compressor.

The compressor unit 1, in this example, as shown in Figure 1 and diagrammatically in Figure 2, comprises two pairs of low-pressure cylinders 5 and one pair of high-pressure cylinders 6. The usual inlet and discharge valves are associated with each cylinder. Air is taken into the low-pressure cylinders through filters 7 associated with the inlets thereof. The air is partially compressed in those low-pressure cylinders and is then discharged through conduits 8 into an intercooler which performs the usual function of cooling the air as it passes from low stage compression to high stage compression. The intercooler 9 is provided with a discharge conduit 10 leading to the inlets of the high-pressure cylinders 6. The high-pressure cylinders 6 are provided with a discharge conduit 11, connected thereto, which leads to the air receiver or tank 12.

With this compressor unit arrangement, air is taken into the low-pressure cylinders where it is subjected to first-stage compression by reciprocation of the pistons therein. As is well understood, the pistons are reciprocated by a crankshaft connected to the drive shaft of the engine 2. The air is then discharged from cylinders 5 into the intercooler 9 which serves to remove some of the heat developed in the first-stage compression. From the intercooler, the partially compressed air is drawn into the high-pressure cylinders 6 where it is further compressed and is then discharged into the receiver tank 12 until a suitable pressure is built up therein.

Figure 3:
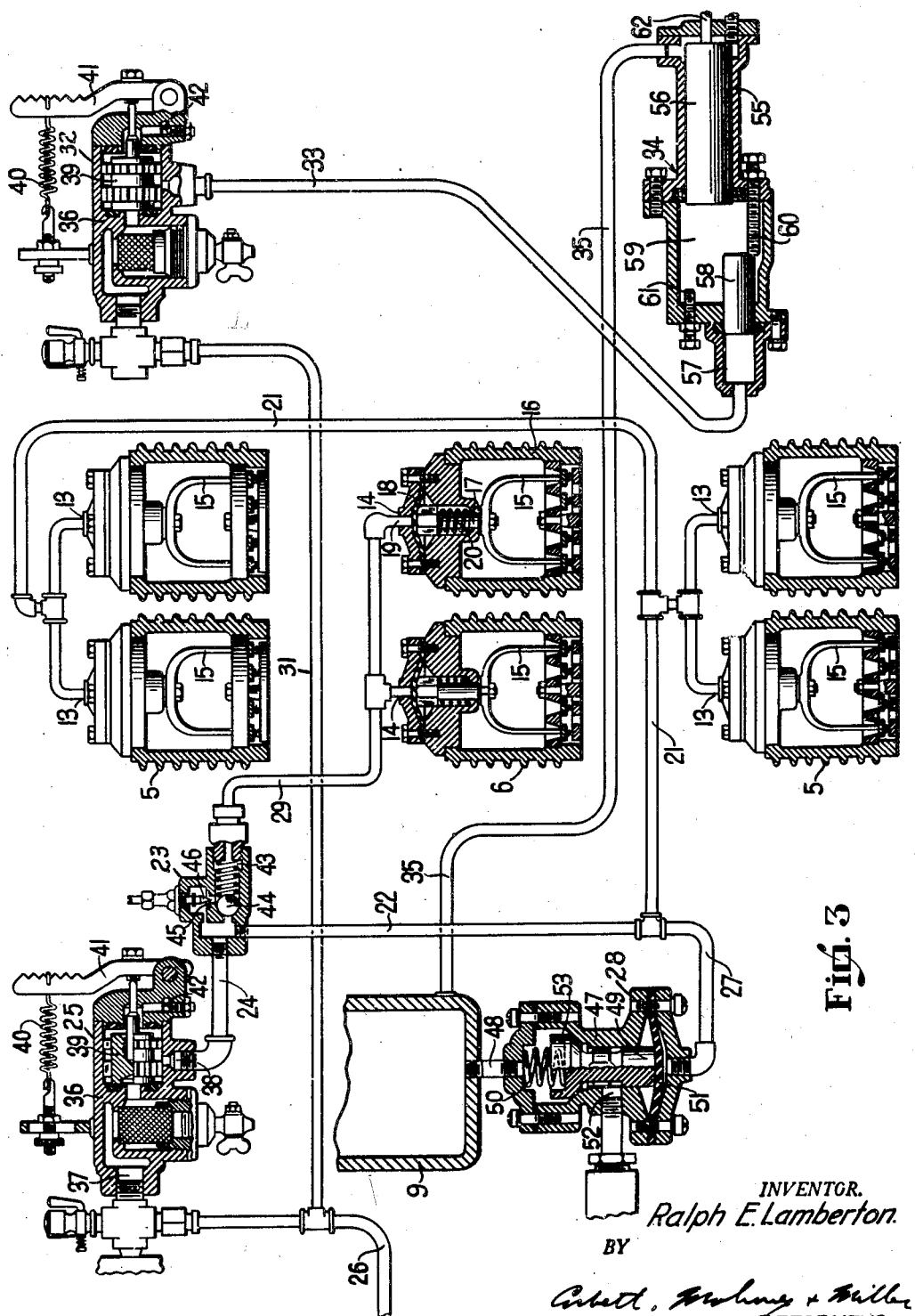
Figure 3 is a view similar to Figure 2 but illustrating the units of the control system in detail in section.

The inlet valves of the various cylinders are shown in Figure 3. Each cylinder is provided with a set of these valves and associated with each set of these valves is an unloading mechanism which at the proper time serves to open the inlet valves and keep them open to prevent building up pressure within the cylinder by reciprocation of the piston therein. The unloading valve mechanisms for the low-pressure cylinders are designated by the numerals 13, in Figure 3, while those for the high-pressure cylinders are designated by the numerals 14. These mechanisms are of the usual type employed in compressors for this purpose but are briefly described below.

Each of these unloaders comprises depending fingers 15 adapted to engage the inlet valves and to force them open and hold them open. The fingers 15 are disposed within a housing 16, mounted on the cylinder in association with the inlet valves, and are carried on the lower end of a pin or rod 17 disposed for vertical sliding movement in the top of the housing and having its upper end connected to a flexible diaphragm 18 clamped in the top of the housing. Above the diaphragm, an inlet 19 is provided. Surrounding pin 17 is a spring 20 which keeps the diaphragm normally in its uppermost position as shown in Figure 3. Air pressure entering through inlet 19 will flex the diaphragm 18 downwardly, moving fingers 15 downwardly and causing them to open the cylinder inlet valves.

The unloading valve mechanism 13 of the low-pressure cylinders are all connected to a line or conduit 21 which in turn, is connected to a line 22. The line 22 is connected to one side of a delay valve 23 and the valve 23 is connected by a line 24 to a pilot valve 25. The valve 25 is connected to a line 26 which leads to the receiver 12. A branch line 27 leads from line 22 to the intercooler relief valve 28. A branch line 29 leads from the delay valve to the high-pressure cylinders valve unloading mechanisms 14. A line 31 leads from the line 26 and is connected to a pilot valve 32. This valve 32 is connected by a line 33 to one end of the housing of the fuel valve regulator 34. Subsequently, I shall refer to the valve 32 as the first pilot valve and the valve 25 as the second pilot valve since this is their order of operation after the compressor is loaded.

The pilot valves 25 and 32 are identical and, therefore, a description of one will suffice. These valves are of the usual type and a detailed description is not necessary. Referring to valve 25, it will be apparent that it includes a valve housing 36 having an inlet 37 connected to line 26 and an outlet 38 connected to line 24. Within the housing 36 is the reciprocable valve piston 39 which is normally maintained in valve-closing position by an adjustable spring 40 which is associated with a lever 41 which serves to move the valve member to the left or closing position, as shown in Figure 3. When in the position shown, the piston chamber and, therefore, the line 24 is vented through an adjustable vent 42.

The delay valve 23 is also of the usual type and includes a main passageway 43 controlled by a ball valve 44. A by-pass or return passageway 45 is controlled by a needle valve 46. When pilot valve 25 opens, receiver pressure flows through and from valve 25 into delay valve 23 where it unseats ball 44 and flows on through valve 23 into line 29 and then into the units 14 for actuating such units. When valve 25 closes and line 24 is vented, there is a delay in venting line 29 and, consequently, the diaphragm chambers of units 14, because the air from line 29 must return through the needle valve controlled by-pass 45 which can be adjusted to provide a very slow flow. Thus, freeing of the inlet valves of the high-pressure cylinders will be delayed and will result in a desirable feature of operation hereinafter mentioned.

The pilot valve 32 controls flow of air pressure between lines 31 and 33 and does not have a delay valve associated therewith.

The intercooler relief valve 28 is of the usual type. The lower end of the housing 47 thereof is connected to line 27 while its upper end is connected by conduit 48 to the intercooler 9. A piston valve 49 is vertically slidable in the housing 47 and is normally maintained in its lower position by a compression spring 50 bearing against the upper end thereof. A diaphragm 51 is provided at the lower end of piston 49 and pressure supplied through lines 22 and 27 upon opening pilot valve 25 will act to lift piston 49. The housing 47 is provided with a vent passageway 52 for venting air from the intercooler. Venting is normally precluded by valve piston 53 being held on its associated seat by spring 50. When receiver pressure reaches diaphragm 51, the valve piston 53 is raised, allowing the intercooler pressure to vent through passageway 52.

At the same time that receiver pressure reaches intercooler relief valve 28, due to opening of pilot valve 25, it also reaches the unloading valve mechanisms 13 of the low pressure cylinders through lines 22 and 21. This will result in the inlet valves of the low pressure cylinders being held open and, consequently, in unloading of such cylinders. Fluid pressure used in actuating units 13 will vent back through lines 21 and 22, line 24 and vent 42 of valve 25. The delay valve 23 will have no effect on operation of units 13.

The pressure-actuated regulator 34 is associated with and controls the fuel supply control lever 4, as shown best in Figures 1 and 2. A spring 54 normally maintains this lever in idling speed position.

As shown in Figure 3, the regulator 34 comprises a casing having a cylindrical piston-receiving chamber 55 at one end thereof in which the main piston 56 is disposed for reciprocation. At the other end of the casing, there is provided a piston-receiving chamber 57 in which an auxiliary piston 58 is disposed for reciprocation. The inner ends of both pistons are mounted slidably in opposite walls of an intermediate chamber 59. An adjustable stop screw 60 is provided in one end of chamber 59 and is directed towards piston 58 for contacting with the inner end thereof to limit movement of such piston in one direction. An adjustable stop screw 61 is provided in the opposite end wall of chamber 59 and is directed towards piston 56 for contacting with the inner end thereof to limit movement of such piston in the opposite direction. The main piston 56 is provided with a piston rod 62 which extends outwardly through the end wall of chamber 55 and is connected by a pivoted link 63 to the upper end of lever 4, as shown best in Figure 2.

Figure 4:
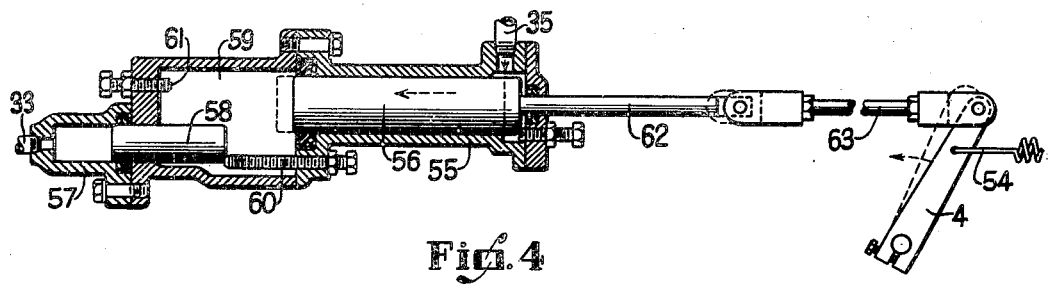
Figure 4 is a longitudinal sectional view through the casing of the pressure-operated regulator, showing the parts thereof in the positions they occupy before starting the compressor, which are such that the engine which the regulator controls will operate at idling speed.
Figure 5:
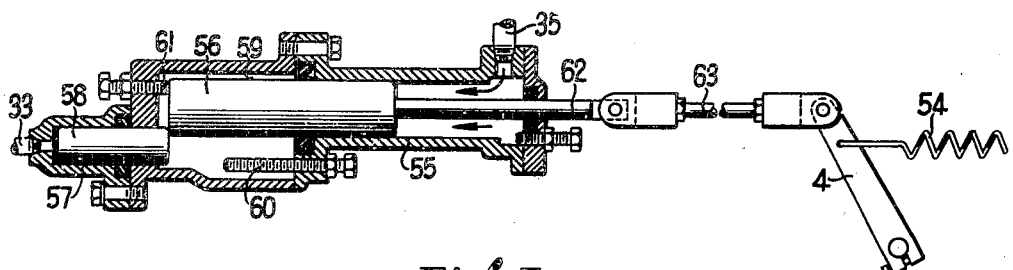
Figure 5 is a similar view but showing the regulator in full-speed condition.
Figure 6:
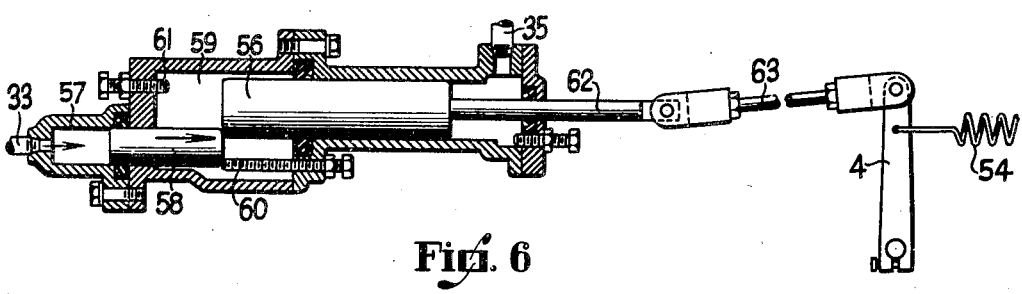
Figure 6 is a similar view but showing the regulator in intermediate speed condition.
Figure 7:
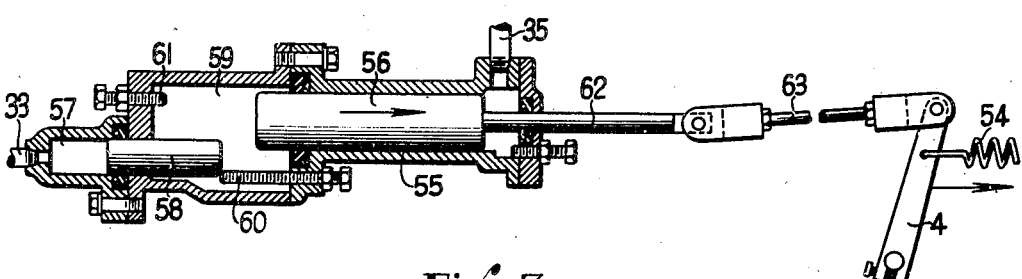
Figure 7 is a similar view but showing the regulator after it is again in idling speed condition.

As soon as the clutch, in the drive between the engine 2 and compressor unit 1, is engaged, the low pressure cylinders 5 will start taking in air through inlets 7 and will pump the air through the discharge conduits 8 into the intercooler 9. At this time, the fuel control lever 4 will be in idling speed position because of the force exerted thereon by spring 54. At this time, also, the valves 25, 23, 32, and 28 will be closed. Consequently, the unloading mechanisms 13 and 14 will be inoperative, the intercooler will not be vented, and the regulator 34, will be in the condition illustrated in Figure 4. Pressure built up in the intercooler, will act directly on the right-hand end of piston 56, through line 35 and chamber 55, as shown in Figures 4 and 5, and when sufficient, for example about 10 pounds, will overcome the force of spring 54 and will move the main piston 56 to the left (Figure 5) until it strikes the stop screw 61. During this movement, the inner end of piston 56 will engage the inner end of auxiliary piston 58 and also move it to the left. Obviously, this moves the lever 4 to full-speed position and the engine 2 will operate at full speed. As the low pressure cylinders 5 pump partially compressed air into the intercooler 9, the high-pressure cylinders 6 withdraw such air from the intercooler through conduit 11 into the receiver 12. This will gradually build up pressure in the receiver and as soon as it reaches a preselected intermediate pressure, for example 90 pounds, the first pilot valve 32 will open due to the action of the receiver pressure thereon through line 31. Valve 32 will allow the receiver pressure to flow on through line 33 to the left-hand end of regulator 34, as shown in Figure 6, where it will enter chamber 57 and move auxiliary piston 58 to the right until it engages stop screw 60. As soon as piston 58 starts to move, it engages piston 56 and moves it to the right, it being understood that the receiver pressure acting on piston 58 is much greater, 90 pounds as indicated above, than the maximum intercooler pressure, for example 27 pounds, which acts on the piston 56. Movement of the piston 56, as indicated, moves the lever 4 to an intermediate speed position, for example ¾ speed. The engine 2 operating at intermediate speed will drive the compressor unit 1 at such a rate as to maintain a sufficient normal or intermediate pressure, about 90 pounds, in the receiver 12 under normal working conditions. However, if the demand on the receiver is too great so that such pressure is not maintained, but the pressure drops, for example to 85 pounds, the valve 32 will close, venting chamber 57 and allowing the intercooler pressure to move the piston 56 to full speed position so as to drive the compressor unit 1 at full speed. On the other hand, if the demand on the receiver is light after the lever 4 is moved into intermediate speed position (Figure 6), the pressure on the receiver will be built up further. However, as soon as it reaches a preselected maximum, for example 100 pounds, the compressor unit 1 is unloaded and the regulator assumes the condition illustrated in Figure 7 so as to bring the engine to idling speed. This is accomplished by opening of the second pilot valve 25 when the maximum receiver pressure is reached and acts thereon through line 26. This permits air from the receiver to flow through lines 24, 22 and 21 to the low-pressure cylinders unloading mechanisms 13 and through lines 24, delay valve 23, and line 29, to the unloading mechanisms 14 of the high-pressure cylinders, thus unloading all of the cylinders simultaneously. At the same time, receiver pressure acts through lines 24, 22 and 27, on valve 28, and opens it, allowing intercooler pressure to vent through line 48, valve 28 and vent 52 thereof. Thus, unloading of all the cylinders prevents further development of pressure in intercooler 9 and venting of the intercooler will lower the pressure therein sufficiently, for example to about 7 pounds, at which time, the pressure exerted on lever 4 by spring 54 (Figure 2) will be sufficient to overcome the remaining low intercooler pressure in chamber 55 and, therefore, will move piston 56 and lever 4 to the right or idling speed positions, as shown in Figure 7.

The engine will now continue to idle and operate the compressor at a low rate without creating further pressure in the receiver 12. As soon as the pressure in the receiver drops sufficiently because of the demand thereon, for example to about 95 pounds, pilot valve 25 will close, due to the lower receiver pressure acting thereon through line 26, venting pressure fluid from lines 22, 21 and 27 and, consequently, from all the low-pressure cylinders unloaders 13 and intercooler relief valve 28. This will result in the low-pressure cylinders 5 immediately starting to pump air into the intercooler. At the same time, the delay valve 23 delays escape of air pressure from the high-pressure cylinders unloaders 14 through line 29, since it must by-pass through needle valve controlled return-passageway 45. This delay ensures that the low-pressure cylinders 5 will have had time to pump up some air pressure in the intercooler 9 so that such pressure will act through line 35 and the main piston 56 to move it at least to the intermediate speed position shown in Figure 6, so that the lever 4 will be in intermediate speed position, by the time all pressure has escaped through the delay valve 23, and thereby permitting the high-pressure cylinders 6 to load and start pumping air into the receiver 12. If there is a further drop in pressure within receiver 12, say to about 85 pounds, pilot valve 32 will close, due to the decrease in receiver pressure acting thereon through line 31, and pressure within line 33 will be vented from chamber 57, allowing intercooler pressure acting through line 35 on piston 56 to move both that piston and piston 58 to the extreme left, as shown in Figure 5, setting the lever 4 in maximum or full-speed position. Thereafter, the cycle of operation of the regulator and controlled units will be repeated in accordance with the air demands on the receiver and, consequently, the load demands on the compressor unit.

In Figure 8, I have shown a somewhat different control system wherein instead of unloading the low and high-pressure cylinders simultaneously, the low-pressure cylinders are first unloaded and after a short delay, the high-pressure cylinders are unloaded. This results in an economy, since the partially compressed air will be pumped from the intercooler by the high-pressure cylinders, even after the low-pressure cylinders are unloaded, since the intercooler is not vented until the high-pressure cylinders are unloaded.

The system in Figure 8 is exactly the same as that previously described except that the delay valve 23 is eliminated and the valve 28a, associated with the intercooler, is different from valve 28. Instead of line 24 connecting to valve 23, it is connected to line 21a leading to the low-pressure cylinders unloaders 13. Line 27a, leading to valve 28a, is also connected to line 21a. Also, in this instance, the line 29a leads from the valve 28a to the high-pressure cylinders unloaders 14.

As previously indicated, the valve 28a is different from valve 28, being provided with a small lower piston 51a and a larger upper piston 53a connected as a unit. Piston 53a is normally held by spring 50a on a valve seat 53b and is provided with vertical channels 53c in its periphery so that when unseated air can flow past it. The line 27a is connected to the bottom of valve 28a while the line 29a is connected to the side of the valve. Piston 51a is provided with channels 51b in its periphery and normally prevents communication between lines 27a and 29a. Vent 52a communicates with the interior of the valve 28a at a point above piston 51a so that it also is normally closed.

In the operation of this system, the low-pressure cylinders 5 will start pumping when the clutch in the engine drive is engaged and pressure will be created in the intercooler 9. The regulator 34 will, at this time, be in the condition illustrated in Figure 4. Pressure built up in the intercooler will act, as previously described, to move the main piston 56 and auxiliary piston 58 to the left, to the positions shown in Figure 5, so that the engine will operate at full speed. The high-pressure cylinders 6 will withdraw air from the intercooler 9 and force it into the receiver 12 where pressure is gradually built up. When a suitable intermediate pressure is built up in the receiver, the first pilot valve 32 opens as before and causes auxiliary piston 58 to be moved to the right, as shown in Figure 6, and move piston 56 to the right so that the engine will operate at intermediate speed. If the pressure in the receiver is not maintained sufficiently high, the valve 32 will close and allow the regulator 34 to move into full speed condition again. If the demand is light and the receiver pressure builds up to maximum, the compressor unit 1 is unloaded and the regulator assumes the idling-speed condition illustrated in Figure 7. This is accomplished by opening of the second pilot valve 25 which permits receiver pressure to act on the unloaders 13 of the low-pressure cylinders but not on the unloaders 14 of the high-pressure. Thus, the low-pressure cylinders are unloaded first. The high-pressure cylinders will continue to pump air from the intercooler into the receiver until the intercooler pressure drops sufficiently, for example to 7 pounds, at which time the valve 28a will function.

When valve 25 is opened, receiver pressure also acts on the piston 51a of valve 28a but will not lift the piston until the intercooler pressure is reduced as indicated. Since the piston 53a has a much greater area which is subjected to the normal intercooler pressure as compared to the area of piston 51a which is subjected to the higher receiver pressure, the pistons 51a and 53a are maintained in their lowermost positions until normal intercooler pressure is reduced by the still loaded high-pressure cylinders pumping air therefrom. When the intercooler pressure does drop sufficiently, the pistons 51a and 53a will be forced upwardly allowing communication between lines 27a and 29a and actuating unloaders 14 to unload the high-pressure cylinders. At the same time, the remaining intercooler pressure is permitted to vent past piston 53a through vent passageway 52a to the atmosphere. As soon as intercooler pressure is vented, the piston 56 of the regulator will move to the position shown in Figure 7 to set the engine at idling speed. As soon as the receiver pressure drops sufficiently to an intermediate pressure, the pilot valve 25 closes and will vent receiver pressure from lines 21a and 27a and the lower part of valve 28a. This permits spring 50a to close valve 28a and vents the pressure from low-pressure cylinder unloaders 13. Closing of valve 28a permits the low-pressure cylinders to start building up pressure in the intercooler and this pressure will immediately move piston 56 to the position shown in Figure 6 or to intermediate speed position. Pressure from the high-pressure cylinders unloaders 14 will vent through line 29a, through channels 51b in piston 51a and then out through vent 52a. This will only occur after a period of delay subsequent to loading the low-pressure cylinders, since such cylinders first must build up sufficient pressure in the intercooler to close valve 28a. With a further drop in receiver pressure, which will only occur when the demand on the receiver is great, the pilot valve 32 will close, venting pressure in line 33 to the atmosphere and permitting intercooler pressure to move the piston 56 to full-speed position. With a decrease in air demand, receiver pressure will again rise to an intermediate pressure causing the pilot valve 32 to open and the engine speed to drop to intermediate speed. Further decrease in air demand and, consequent, increase in receiver pressure to the maximum will cause the pilot valve 25 to open and, thereby, the compressor to be unloaded and the engine speed to be reduced to idling speed. The cycle of operation will depend entirely on the air receiver pressure which varies with the air demand or use.

It will be apparent that my compressor control system is such that the power unit will be controlled effectively and economically in accordance with air demand. The speed of the power unit or driving engine is closely controlled in accordance with pressure demands on the compressor unit, the speed of the engine being at a maximum when the demand is high and there is minimum receiver pressure, being within an intermediate range when the demand is normal and the pressure is intermediate, and being at idling speed when the demand is light and the pressure is at a maximum. The control system is especially applicable to a multistage compressor, using both intercooler pressure and receiver pressure and the differential therebetween, as the actuating media, thereby making it possible to use lighter and more sensitive control units than if receiver pressure alone were used as the actuating medium. Furthermore, in one form of my invention, unloading of the high-pressure cylinders and venting of the intercooler is delayed after unloading of the low-pressure cylinders, so that substantially all the partially compressed air is withdrawn from the intercooler by such high-pressure cylinders. Thus, such air is not wasted. In both forms of my invention, reloading of the high-pressure cylinders is delayed a short period after reloading of the low-pressure cylinders, to permit the engine to pick up sufficient speed before being subjected to its full load and thereby preventing stalling of the engine. Although, my control system is very efficient and effective, it is still extremely simple.

Having thus described my invention, what I claim is:

1. In combination with a compressor unit and a power unit, said power unit having a speed control element associated therewith, said compressor unit being provided with a low-pressure cylinder, a high-pressure cylinder, an intermediate intercooler, and a receiver for receiving compressed fluid from the high-pressure cylinder, said cylinders being provided with fluid-actuated unloaders, and a control system for controlling actuation of said unloaders and said speed control element, said control system including a fluid-actuated regulator, said regulator comprising a control member operatively connected to said speed control element and movable by intercooler pressure, yieldable means tending to maintain said control member in idling speed position, means for continuously subjecting said control member to intercooler pressure so that such pressure tends to move said member into full-speed position, said regulator including a second control member associated with the first and movable by receiver pressure, movement of said second-named control member causing movement of said first-named control member in the speed-reducing direction to an intermediate speed position, means for subjecting said second-named control member to receiver pressure only when the receiver pressure reaches a predetermined intermediate pressure, means for subjecting said unloaders to receiver pressure to cause actuation thereof only when the receiver pressure reaches a predetermined maximum pressure, and means controlled by said last-named means for venting the intercooler and thereby to relieve said first-named control member of intercooler pressure so that it will be moved into idling-speed position by said yieldable means.

2. The combination set forth in claim 1 wherein the means for subjecting the unloaders to receiver pressure includes means for subjecting the unloaders of the low and high-pressure cylinders to such pressure simultaneously and means for causing reloading of the low-pressure cylinder prior to reloading of the high-pressure cylinder.

3. The combination set forth in claim 1 wherein the means for venting the intercooler also controls flow of receiver pressure to the high-pressure cylinder so as to delay unloading of said cylinder after said low-pressure cylinder is unloaded.

4. The combination set forth in claim 3 wherein said means also delays reloading of the high-pressure cylinder until after reloading of the low-pressure cylinder.

5. In combination with a compressor unit and a power unit having a speed control element associated therewith and movable to control the speed of such unit said compressor unit being provided with a low-pressure cylinder, a high-pressure cylinder, an intermediate intercooler, and a receiver for receiving compressed fluid from the high-pressure cylinder, said cylinders being provided with fluid-actuated unloaders, and a control system for controlling actuation of said unloaders and said speed control element, said control system including a fluid-actuated regulator, said regulator comprising a casing having a piston disposed therein which is operatively connected to said speed control element and is movable by intercooler pressure towards high-speed position, a spring tending to normally hold said piston in idling-speed position, a conduit connecting said intercooler with said casing so that said piston is always subjected to intercooler pressure which if sufficient will move said piston to full-speed position, a second piston disposed in said casing and movable by receiver pressure so that it will move the first piston in the speed-reducing direction to an intermediate speed position, a conduit connecting the receiver to said casing so as to supply the receiver pressure for moving said second piston, a pilot valve in said last named conduit adapted to open to supply receiver pressure to said second piston only when receiver pressure reaches a predetermined intermediate pressure so as to move said second piston and to cause it to move into an intermediate-speed position, a second pilot valve for subjecting said unloaders to receiver pressure to cause actuation thereof only when the receiver pressure reaches a predetermined maximum pressure, and an intercooler relief valve controlled by said second pilot valve for venting the intercooler and thereby to relieve said first-named piston of intercooler pressure so that it will be moved into idling-speed position by said spring.

6. The combination set forth in claim 5 wherein the second pilot valve is connected to all of the cylinder unloaders for unloading all of them simultaneously and wherein a delay valve is associated with said second pilot valve between it and the high-pressure cylinders unloaders so as to delay return of fluid from said unloaders to the pilot valve where it is vented and thereby to delay reloading of the high-pressure cylinders relative to reloading of the low-pressure cylinders.

7. The combination set forth in claim 5 wherein the second pilot valve is connected directly to the low-pressure cylinders unloaders but is connected through the intercooler relief valve to the high-pressure cylinders unloaders, said relief valve having a valve portion which controls venting of the intercooler and a second valve portion which controls flow of receiver fluid to the high-pressure cylinders unloaders and venting of fluid from such unloaders.

8. The combination set forth in claim 7 wherein said valve portions of the intercooler relief valve are pistons of unequal area, the larger piston being acted upon by intercooler pressure and the smaller by receiver pressure supplied by the second pilot valve, and a spring for normally holding both of said pistons in closed positions.

9. Apparatus according to claim 7 wherein the piston of the regulator which is subjected to intercooler pressure is of larger area than the other piston.

10. Apparatus according to claim 7 wherein the pistons of the regulator are disposed in opposite ends of the casing with their inner ends directed towards each other and being so disposed as to engage each other upon relative movement towards each other.

11. Apparatus according to claim 10 wherein an adjustable stop is provided for engaging the inner end of one of said pistons upon movement in one direction and an adjustable stop is provided for engaging the inner end of the other of said pistons upon its movement in the opposite direction.

12. In combination with a compressor unit and a power unit, said power unit having a speed control element associated therewith, said compressor unit being provided with a low-pressure cylinder, a high-pressure cylinder, an intermediate intercooler, and a receiver for receiving compressed fluid from the high-pressure cylinder, fluid-actuated means for unloading said cylinders, and a control system for controlling actuation of said unloading means and said speed control element, said control system including a fluid-actuated regulator, said regulator being operatively connected to said speed control element, yieldable means tending to maintain said speed control element in idling speed position, means for continuously subjecting said regulator to intercooler pressure so that such pressure tends to cause the regulator to move the speed control element into full-speed position, means for subjecting said regulator to receiver pressure which opposes the intercooler pressure thereon and causes the regulator to move the speed control element to an intermediate speed position, said last-named means functioning only when the receiver pressure reaches a predetermined intermediate pressure, means for actuating said fluid-actuated unloading means only when the receiver pressure reaches a predetermined maximum pressure, and means controlled by said last-named means for venting the intercooler and thereby relieving said regulator of intercooler pressure so that it will permit movement of said speed control element into idling-speed position by said yieldable means.

13. In combination with a compressor unit and a power unit, said power unit having a speed control element associated therewith, said compressor unit being provided with a low-pressure cylinder, a high-pressure cylinder, an intermediate intercooler, and a receiver for receiving compressed fluid from the high pressure cylinder, fluid-actuated means for unloading said cylinders, and a control system for controlling actuation of said unloading means and said speed control element, said control system including a fluid-actuated regulator, said regulator being operatively connected to said speed control element, means for continuously subjecting said regulator to intercooler pressure so that such pressure tends to cause the regulator to move the speed control element into full-speed position, means for subjecting said regulator to receiver pressure which opposes the intercooler pressure and causes the regulator to move the speed control element to an intermediate speed position, said last-named means functioning only when the receiver pressure reaches a predetermined intermediate pressure, means for actuating said fluid-actuated unloading means only when the receiver pressure reaches a predetermined maximum pressure, and means controlled by said last-named means for venting the intercooler and thereby relieving said regulator of intercooler pressure to permit movement of the regulator and the speed control element into idling speed position.

RALPH E. LAMBERTON.

REFERENCES CITED

The following references are of record in the file of this patent:

UNITED STATES PATENTS

| Number | Name | Date |
| --- | --- | --- |
| 664,562 | De Laval | Dec. 25, 1900 |
| 834,627 | Longacre | Oct. 30, 1906 |
| 1,248,740 | Wineman | Dec. 4, 1917 |
| 1,394,819 | Ferguson | Oct. 25, 1921 |
| 2,225,854 | Baker | Dec. 24, 1940 |
| 2,380,226 | Frantz | July 10, 1945 |